(12) United States Patent
Keene et al.

(10) Patent No.: US 11,901,748 B2
(45) Date of Patent: Feb. 13, 2024

(54) STATE-OF-CHARGE BALANCING IN BATTERY MANAGEMENT SYSTEMS FOR SI/LI BATTERIES

(71) Applicant: Enevate Corporation, Irvine, CA (US)

(72) Inventors: Samuel Keene, Long Beach, CA (US); Benjamin Yong Park, Mission Viejo, CA (US); Samer Saab, Irvine, CA (US)

(73) Assignee: Enevate Corporation, Irvine, CA (US)

( * ) Notice: Subject to any disclaimer, the term of this patent is extended or adjusted under 35 U.S.C. 154(b) by 0 days.

(21) Appl. No.: 17/591,334

(22) Filed: Feb. 2, 2022

(65) Prior Publication Data

US 2023/0246458 A1    Aug. 3, 2023

(51) Int. Cl.
| | |
|---|---|
| H02J 7/00 | (2006.01) |
| H01M 10/0525 | (2010.01) |
| H01M 10/44 | (2006.01) |
| H01M 10/42 | (2006.01) |
| H01M 10/48 | (2006.01) |
| H01M 4/38 | (2006.01) |
| H01M 4/02 | (2006.01) |

(52) U.S. Cl.
CPC .......... *H02J 7/0014* (2013.01); *H01M 4/386* (2013.01); *H01M 10/0525* (2013.01); *H01M 10/4257* (2013.01); *H01M 10/44* (2013.01); *H01M 10/48* (2013.01); *H02J 7/0048* (2020.01); *H01M 2004/027* (2013.01); *H01M 2010/4271* (2013.01)

(58) Field of Classification Search
CPC .. H02J 7/0014; H02J 7/0048; H01M 10/0525; H01M 10/4257; H01M 10/44; H01M 10/48; H01M 4/386; H01M 2004/27; H01M 2010/4271

USPC ......................................................... 320/118
See application file for complete search history.

(56) References Cited

U.S. PATENT DOCUMENTS

| | | | |
|---|---|---|---|
| 9,500,713 | B1 | 11/2016 | Ghantous et al. |
| 10,969,436 | B1* | 4/2021 | Sarwat ................. G01R 31/387 |
| 11,231,465 | B2* | 1/2022 | Song .................... H01M 10/425 |
| 11,309,720 | B2* | 4/2022 | Ito ...................... H01M 10/0525 |
| 11,569,668 | B2* | 1/2023 | Tyagi .................... H02M 1/007 |

(Continued)

OTHER PUBLICATIONS

Jichao Hong, et al., "Online accurate state of health estimation for battery systems on real-world electric vehicles with variable driving conditions considered", Journal of Cleaner Production, Jan. 6, 2021, 16 pages.

(Continued)

*Primary Examiner* — Nathaniel R Pelton
(74) *Attorney, Agent, or Firm* — McAndrews, Held & Malloy

(57) ABSTRACT

Systems and methods are provided for state-of-charge balancing in battery management systems for Si/Li batteries. State-of-charge (SOC) of one or more lithium-ion cells may be assessed, and based on the assessing of the SOC, the one or more lithium-ion cells may be controlled. The controlling may include setting or modifying one or more operating parameters of at least one lithium-ion cell, and the controlling may be configured to equilibrate the SOC of the one or more lithium-ion cells or to modify an SOC of at least one lithium-ion cell so that the one or more lithium-ion cells have a balanced SOC.

30 Claims, 5 Drawing Sheets

(56) References Cited

U.S. PATENT DOCUMENTS

| | | |
|---|---|---|
| 2009/0061325 A1 | 3/2009 | Odani et al. |
| 2009/0297951 A1 | 12/2009 | Katsura et al. |
| 2011/0143201 A1 | 6/2011 | Takada et al. |
| 2013/0119940 A1* | 5/2013 | Iriyama ................. H01M 10/44 320/134 |
| 2014/0333317 A1 | 11/2014 | Frost et al. |
| 2015/0280290 A1 | 10/2015 | Saha et al. |
| 2016/0116548 A1 | 4/2016 | Ghantous et al. |
| 2016/0202324 A1 | 7/2016 | Biletska et al. |
| 2017/0242077 A1 | 8/2017 | Guo et al. |
| 2018/0212234 A1* | 7/2018 | Haufe ................... H01M 4/622 |
| 2018/0287219 A1 | 10/2018 | Sood et al. |
| 2018/0301749 A1 | 10/2018 | Krasovitsky et al. |
| 2020/0088797 A1 | 3/2020 | Takahashi |
| 2020/0400750 A1* | 12/2020 | Du ....................... H02J 7/0048 |
| 2020/0403415 A1* | 12/2020 | Inoue ................... H02J 7/0018 |
| 2021/0148987 A1 | 5/2021 | Ghantous et al. |
| 2021/0336299 A1* | 10/2021 | Matthey ................. H02J 7/005 |
| 2022/0065943 A1 | 3/2022 | Ott et al. |

OTHER PUBLICATIONS

Xiong Feng, et al., "State-of-charge estimation of lithium-ion battery based on clockwork recurrent neural network", Energy, Jul. 3, 2021, 10 pages.

Yihuan Li, et al., "Lithium-ion battery capacity estimation—A pruned convolutional neural network approach assisted with transfer learning", Applied Energy, Jan. 4, 2021, 13 pages.

Kodjo S.R. Mawonou, Akram Eddahech, Didier Dumur, Dominique Beauvois, Emmanuel Godoy. "State-of-health estimators coupled to a random forest approach for lithium-ion battery aging factor ranking", Journal of Power Sources, Elsevier, Jan. 10, 2021, 28 pages.

* cited by examiner

US 11,901,748 B2

STATE-OF-CHARGE BALANCING IN BATTERY MANAGEMENT SYSTEMS FOR SI/LI BATTERIES

CROSS-REFERENCE TO RELATED APPLICATIONS/INCORPORATION BY REFERENCE

This patent application also makes reference to:
U.S. patent application Ser. No. 17/548,830, filed on Dec. 13, 2021;
U.S. patent application Ser. No. 17/548,845, filed on Dec. 13, 2021; and
U.S. patent application Ser. No. 17/548,851, filed on Dec. 13, 2021.

Each of the above identified applications is hereby incorporated herein by reference in its entirety.

TECHNICAL FIELD

Aspects of the present disclosure relate to energy generation and storage. More specifically, certain implementations of the present disclosure relate to methods and systems for a state-of-charge balancing in battery management systems for Si/Li batteries.

BACKGROUND

Various issues may exist with conventional battery technologies. In this regard, conventional systems and methods, if any existed, for designing and producing batteries or components thereof may be costly, cumbersome, and/or inefficient—e.g., they may be complex and/or time consuming to implement, and may limit battery lifetime.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

System and methods are provided for state-of-charge balancing in battery management systems for Si/Li batteries, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION

Figure 1A:
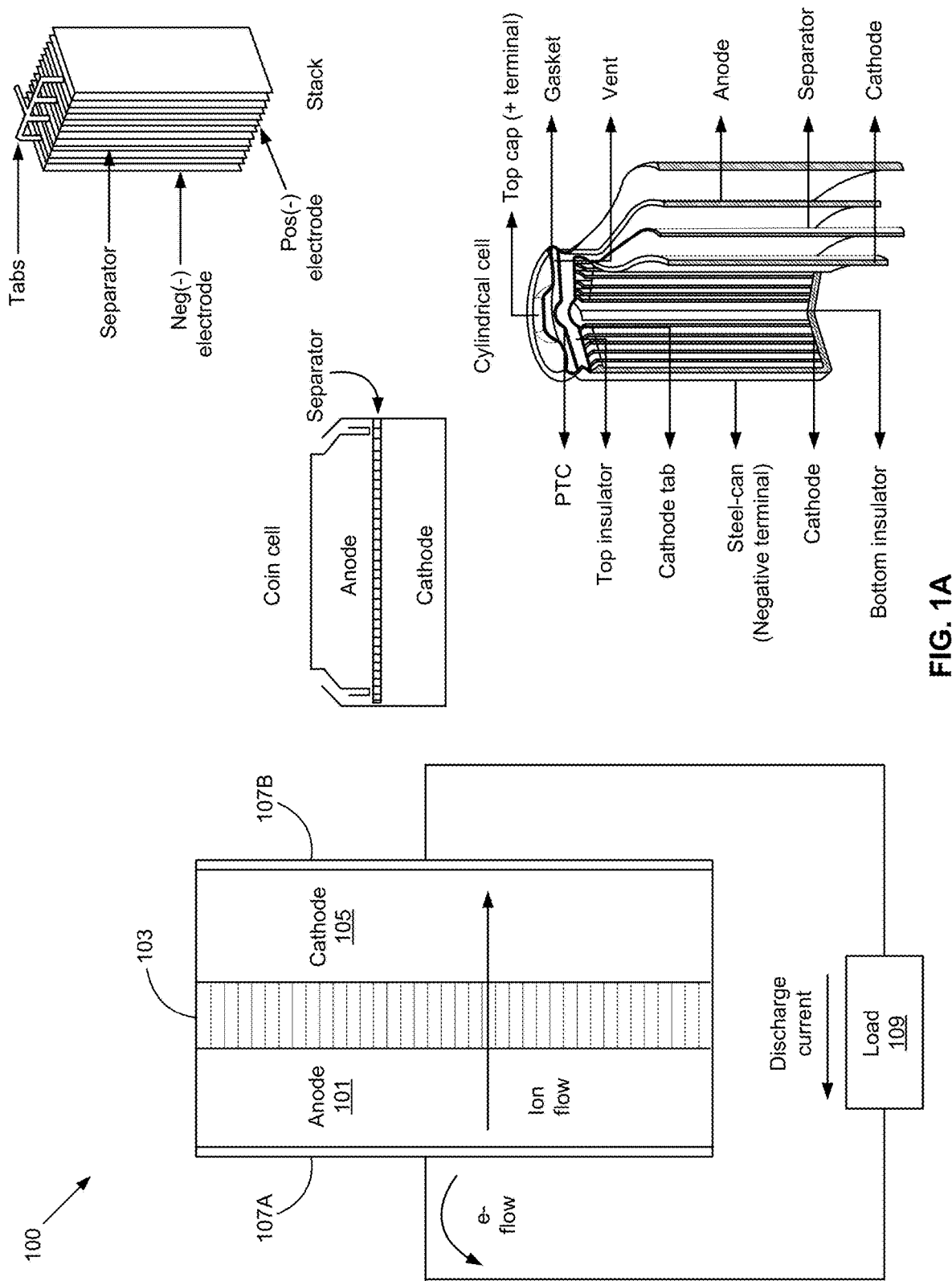
FIG. 1A is a diagram of an example battery.

FIG. 1A is a diagram of an example battery. Referring to FIG. 1A, there is shown a battery 100 comprising a separator 103 sandwiched between an anode 101 and a cathode 105, with current collectors 107A and 107B. There is also shown a load 109 coupled to the battery 100 illustrating instances when the battery 100 is in discharge mode. In this disclosure, the term "battery" may be used to indicate a single electrochemical cell, a plurality of electrochemical cells formed into a module, and/or a plurality of modules formed into a pack. Furthermore, the battery 100 shown in FIG. 1A is a very simplified example merely to show the principle of operation of a lithium ion cell. Examples of realistic structures are shown to the right in FIG. 1A, where stacks of electrodes and separators are utilized, with electrode coatings typically on both sides of the current collectors. The stacks may be formed into different shapes, such as a coin cell, cylindrical cell, or prismatic cell, for example.

The development of portable electronic devices and electrification of transportation drive the need for high performance electrochemical energy storage. Small-scale (<100 Wh) to large-scale (>10 KWh) devices primarily use lithium-ion (Li-ion) batteries over other rechargeable battery chemistries due to their high-performance.

The anode 101 and cathode 105, along with the current collectors 107A and 107B, may comprise the electrodes, which may comprise plates or films within, or containing, an electrolyte material, where the plates may provide a physical barrier for containing the electrolyte as well as a conductive contact to external structures. In other embodiments, the anode/cathode plates are immersed in electrolyte while an outer casing provides electrolyte containment. The anode 101 and cathode 105 are electrically coupled to the current collectors 107A and 107B, which comprise metal or other conductive material for providing electrical contact to the electrodes as well as physical support for the active material in forming electrodes.

The configuration shown in FIG. 1A illustrates the battery 100 in discharge mode, whereas in a charging configuration, the load 109 may be replaced with a charger to reverse the process. In one class of batteries, the separator 103 is generally a film material, made of an electrically insulating polymer, for example, that prevents electrons from flowing from anode 101 to cathode 105, or vice versa, while being porous enough to allow ions to pass through the separator 103. Typically, the separator 103, cathode 105, and anode 101 materials are individually formed into sheets, films, or active material coated foils. In this regard, different methods or processes may be used in forming electrodes, particularly silicon-dominant anodes. For example, lamination or direct coating may be used in forming a silicon anode. Examples of such processes are illustrated in and described with respect to FIGS. 2 and 3. Sheets of the cathode, separator and anode are subsequently stacked or rolled with the separator 103 separating the cathode 105 and anode 101 to form the battery 100. In some embodiments, the separator 103 is a sheet and generally utilizes winding methods and stacking in its manufacture. In these methods, the anodes, cathodes, and current collectors (e.g., electrodes) may comprise films.

In an example scenario, the battery 100 may comprise a solid, liquid, or gel electrolyte. The separator 103 preferably does not dissolve in typical battery electrolytes such as compositions that may comprise: Ethylene Carbonate (EC), Fluoroethylene Carbonate (FEC), Propylene Carbonate (PC), Dimethyl Carbonate (DMC), Ethyl Methyl Carbonate (EMC), Diethyl Carbonate (DEC), etc. with dissolved $LiBF_4$, $LiAsF_6$, $LiPF_6$, and $LiClO_4$ etc. In an example scenario, the electrolyte may comprise Lithium hexafluorophosphate ($LiPF_6$) and lithium bis(trifluoromethanesulfonyl)imide (LiTFSI) that may be used together in a variety of electrolyte solvents. Lithium hexafluorophosphate (LiPF$_6$) may be present at a concentration of about 0.1 to 2.0 molar (M) and lithium bis(trifluoromethanesulfonyl)imide (LiTFSI) may be present at a concentration of about 0 to 2.0 molar (M). Solvents may comprise one or more of ethylene carbonate (EC), fluoroethylene carbonate (FEC) and/or ethyl methyl carbonate (EMC) in various percentages. In some embodiments, the electrolyte solvents may comprise one or more of EC from about 0-40%, FEC from about 2-40% and/or EMC from about 50-70% by weight.

The separator 103 may be wet or soaked with a liquid or gel electrolyte. In addition, in an example embodiment, the separator 103 does not melt below about 100 to 120° C., and exhibits sufficient mechanical properties for battery applications. A battery, in operation, can experience expansion and contraction of the anode and/or the cathode. In an example embodiment, the separator 103 can expand and contract by at least about 5 to 10% without failing, and may also be flexible.

The separator 103 may be sufficiently porous so that ions can pass through the separator once wet with, for example, a liquid or gel electrolyte. Alternatively (or additionally), the separator may absorb the electrolyte through a gelling or other process even without significant porosity. The porosity of the separator 103 is also generally not too porous to allow the anode 101 and cathode 105 to transfer electrons through the separator 103.

The anode 101 and cathode 105 comprise electrodes for the battery 100, providing electrical connections to the device for transfer of electrical charge in charge and discharge states. The anode 101 may comprise silicon, carbon, or combinations of these materials, for example. Typical anode electrodes comprise a carbon material that includes a current collector such as a copper sheet. Carbon is often used because it has excellent electrochemical properties and is also electrically conductive. Anode electrodes currently used in rechargeable lithium-ion cells typically have a specific capacity of approximately 200 milliamp hours per gram. Graphite, the active material used in most lithium ion battery anodes, has a theoretical energy density of 372 milliamp hours per gram (mAh/g). In comparison, silicon has a high theoretical capacity of 4200 mAh/g. In order to increase volumetric and gravimetric energy density of lithium-ion batteries, silicon may be used as the active material for the cathode or anode. Silicon anodes may be formed from silicon composites, with more than 50% silicon or more by weight in the anode material on the current collector, for example.

In an example scenario, the anode 101 and cathode 105 store the ion used for separation of charge, such as lithium. In this example, the electrolyte carries positively charged lithium ions from the anode 101 to the cathode 105 in discharge mode, as shown in FIG. 1A for example, and vice versa through the separator 103 in charge mode. The movement of the lithium ions creates free electrons in the anode 101 which creates a charge at the positive current collector 107B. The electrical current then flows from the current collector through the load 109 to the negative current collector 107A. The separator 103 blocks the flow of electrons inside the battery 100, allows the flow of lithium ions, and prevents direct contact between the electrodes.

While the battery 100 is discharging and providing an electric current, the anode 101 releases lithium ions to the cathode 105 via the separator 103, generating a flow of electrons from one side to the other via the coupled load 109. When the battery is being charged, the opposite happens where lithium ions are released by the cathode 105 and received by the anode 101.

The materials selected for the anode 101 and cathode 105 are important for the reliability and energy density possible for the battery 100. The energy, power, cost, and safety of current Li-ion batteries need to be improved in order to, for example, compete with internal combustion engine (ICE) technology and allow for the widespread adoption of electric vehicles (EVs). High energy density, high power density, and improved safety of lithium-ion batteries are achieved with the development of high-capacity and high-voltage cathodes, high-capacity anodes and functionally non-flammable electrolytes with high voltage stability and interfacial compatibility with electrodes. In addition, materials with low toxicity are beneficial as battery materials to reduce process cost and promote consumer safety.

The performance of electrochemical electrodes, while dependent on many factors, is largely dependent on the robustness of electrical contact between electrode particles, as well as between the current collector and the electrode particles. The electrical conductivity of silicon anode electrodes may be manipulated by incorporating conductive additives with different morphological properties. Carbon black (Super P), vapor grown carbon fibers (VGCF), and a mixture of the two have previously been incorporated separately into the anode electrode resulting in improved performance of the anode. The synergistic interactions between the two carbon materials may facilitate electrical contact throughout the large volume changes of the silicon anode during charge and discharge as well as provide additional mechanical robustness to the electrode and provide mechanical strength (e.g., to keep the electrode material in place). Graphenes and carbon nanotubes may be used because they may show similar benefits. Thus, in some instances, a mixture of two or more of carbon black, vapor grown carbon fibers, graphene, and carbon nanotubes may be used as such mixtures or combinations may be especially beneficial.

State-of-the-art lithium-ion batteries typically employ a graphite-dominant anode as an intercalation material for lithium. Silicon-dominant anodes, however, offer improvements compared to graphite-dominant Li-ion batteries. Silicon exhibits both higher gravimetric (3579 mAh/g vs. 372 mAh/g for graphite) and volumetric capacities (2194 mAh/L vs. 890 mAh/L for graphite). In addition, silicon-based anodes have a low lithiation/delithiation voltage plateau at about 0.3-0.4V vs. Li/Li+, which allows it to maintain an open circuit potential that avoids undesirable Li plating and dendrite formation. While silicon shows excellent electrochemical activity, achieving a stable cycle life for silicon-based anodes is challenging due to silicon's large volume changes during lithiation and delithiation. Silicon regions may lose electrical contact from the anode as large volume changes coupled with its low electrical conductivity separate the silicon from surrounding materials in the anode.

In addition, the large silicon volume changes exacerbate solid electrolyte interphase (SEI) formation, which can further lead to electrical isolation and, thus, capacity loss. Expansion and shrinkage of silicon particles upon charge-discharge cycling causes pulverization of silicon particles, which increases their specific surface area. As the silicon surface area changes and increases during cycling, SEI repeatedly breaks apart and reforms. The SEI thus continually builds up around the pulverizing silicon regions during cycling into a thick electronic and ionic insulating layer. This accumulating SEI increases the impedance of the electrode and reduces the electrode electrochemical reactivity, which is detrimental to cycle life.

In some embodiments, dedicated systems and/or software may be used to control and manage batteries or packs thereof. In this regard, such dedicated systems may comprise suitable circuitry for running and/or executing control and manage related functions or operations. Further, such software may run on suitable circuitry, such as on processing circuitry (e.g., general processing units) already present in the systems or it may be implemented on dedicated hardware. For example, battery packs (e.g., those used in electric vehicles) may be equipped with a battery management system (BMS) for managing the batteries (or packs) and operations. An example BMS is illustrated in and described in more detail with respect to FIG. 1B.

In accordance with the present disclosure, control and management of batteries, particularly lithium-ion batteries with silicon-dominant anodes (also referred to herein as "Si/Li batteries" or "Si—Li batteries"), and operation thereof may be improved, particularly by use of enhanced state-of-charge (SOC) models. In this regard, as noted above battery control and management systems (e.g., BMS) may be used to control and manage the operation of a battery, or a battery pack that may be made up of multiple cells, so as to maximize the useful life of the batteries or packs thereof, to operate the batteries or packs thereof within safety limits, to maintain operational specifications (e.g., minimum power, charge rate, etc.) required for the operation of the batteries or packs thereof, and the like.

Such controlling and managing may depend on and/or entail use of various inputs and parameters. For example, SOC may be one of the parameters used in controlling and managing batteries (or battery packs) and/or operations thereof. In this regard, SOC may typically represent level(s) of charge of a battery (or particular cell, or set of cells in a battery pack) relative to its capacity, with SOC values representing charge-based percentage points (e.g., 0.0 or 0%=empty; 1.0 or 100%=full).

In this regard, controlling and managing batteries (or battery packs) based on SOC may comprise performing SOC based balancing. In particular, in instances where a battery pack comprises multiple cells, the cells may be arranged in parallel, in series, or in combination of both—e.g., with subsets of cells arranged in parallel (or in series), and with each subset comprising a number of cells arranged in series (or in parallel). To ensure optimal performance, it may be desirable that the cells may be balanced based on, e.g., SOC thereof. For example, the BMS may routinely calculate the SOC of cells in a battery pack, and based on the calculated SOC, the BMS may control and manage the battery pack—e.g., adjusting the current supplied to individual cells in order to maintain the same voltage or SOC across all of the cells in the battery pack. The calculation of the SOC may be performed if the functional dependence is known, because voltage, current, temperature, and impedance are all measurable quantities. In conventional solutions voltage often may be used as the main indicator of SOC. In this regard, in a battery, a cell's voltage is a function of such parameters and/or factors as applied current, cell impedance, cell temperature, and SOC.

State-of-charge (SOC) based conventional solutions may have some limitations and/or issues, however, particularly when used with particular types of batteries such as Si/Li batteries. In this regard, in a conventional Li-ion battery—that is, a Li-ion battery that typically contains graphite anodes (>50% graphite as the active material), there is a more fixed relationship between voltage (particular, e.g., the open circuit voltage (OCV)) and the SOC, so the SOC may be calculated using simple models that relate measured cell voltage to the OCV based on the current, impedance, and temperature. Thus, a cell may be modeled, for example, as a simple equivalent circuit with temperature-dependent circuit elements. The cell voltage is equal to the OCV plus the current times the total circuit impedance. The OCV is calculated and the fixed relationship between OCV and SOC is used to obtain the SOC. There may also be corrections to the circuit elements based on the state-of-health (SOH) or age of the cell. In conventional Li-ion batteries, these corrections are usually simple linear or polynomial relationships, because there is a simple functional relationship between SOH and cell impedance. Even so, many BMS systems still just use voltage instead of SOC for balancing.

With Si/Li batteries, however, many of the assumptions or considerations used in conventional SOC models may not hold, at least to the extent they do for conventional Li-ion batteries. Thus, in accordance with the present disclosure, improved SOC models may be used to enhance control and management of Si/Li batteries/battery packs, particularly by adjusting these SOC models to account for unique and different characteristics of the Si/Li batteries/battery packs that may particularly affect or pertain to SOC and use thereof in controlling and/or managing these Si/Li batteries/battery packs. This is described in more details below.

Figure 1B:
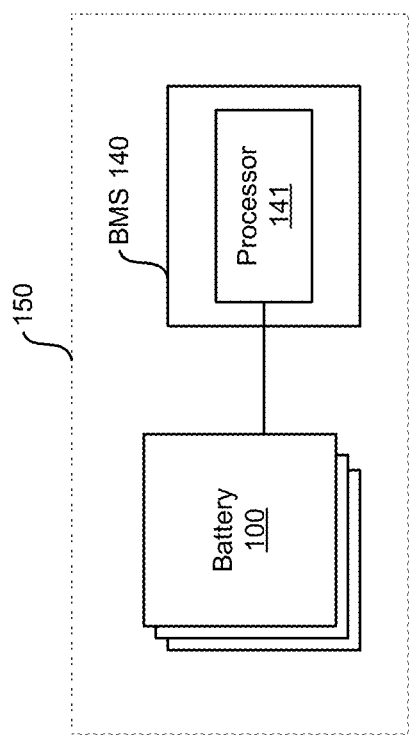
FIG. 1B illustrate an example battery management system (BMS) for use in managing operation of batteries.

FIG. 1B illustrate an example battery management system (BMS) for use in managing operation of batteries. Shown in FIG. 1B is battery management system (BMS) 140.

The battery management system (BMS) 140 may comprise suitable circuitry (e.g., processor 141) configured to manage one or more batteries (e.g., each being an instance of the battery 100 as described with respect with FIG. 1A). In this regard, the BMS 140 may be in communication and/or coupled with each battery 100.

In some embodiments, the battery 100 and the BMS 140 may be in communication and/or coupled with each other, for example, via electronics or wireless communication. In some embodiments, the BMS 140 may be incorporated into the battery 100. Alternatively, in some embodiments, the BMS 140 and the battery 100 may be combined into a common package 150. Further, in some embodiments, the BMS 140 and the battery 100 may be separate devices/components, and may only be in communication with one another when present in the same system. The disclosure is not limited to any particular arrangement, however.

In accordance with the present disclosure, control and management of batteries, particularly lithium-ion batteries with silicon-dominant anodes (Si/Li batteries), and operation thereof may be improved, particularly by use of enhanced state-of-charge (SOC) models. In this regard, battery control and management systems, such as the BMS 140 of FIG. 1B, may be configured to support and facilitate use of enhanced SOC models as described herein. In this regard, as noted above, battery control and management systems, such as the BMS 140 may be used to control the operation of a battery (or a battery pack, which may be made up of multiple cells), so as to maximize the useful life of the battery (or a battery pack), to operate the battery (or a battery pack) within safety limits, to maintain required operational specifications (e.g., minimum power, charge rate), and the like. Such control may comprise performing SOC balancing.

In this regard, performing SOC balancing in a conventional battery (with an anode consisting of >50% graphite) is dependent on several key assumptions, such as: 1) existence of a fixed relationship between open circuit voltage (OCV) and SOC, 2) that the cell impedance may be modeled using an equivalent circuit or equally simple model, and/or 3) that changes to cell impedance based on changing state-of-health (SOH) may be represented by linear or polynomial models.

However, in a Si/Li battery these assumptions generally may not hold. In this regard, the Si-dominant anode (e.g., where >50% of the anode consists of silicon) in such battery may have substantial voltage hysteresis—e.g., up to several hundred mV. Thus, the OCV of the cell may be different between charge and discharge. In addition, when the state of the cell changes from charge to discharge, there may be a nonlinear time-dependent transition in the OCV, and as such there may not be a simple relationship between OCV and SOC. Specifically, in an application such as an electric vehicle, where there are rapid changes between charge and discharge states (corresponding to, respectively, braking and accelerating), the relationship between OCV and SOC may depend on the specific sequence of charge and discharge which cannot be known a-priori. Further, Si-dominant anodes may undergo substantial volume change (up to 400%) on each charge/discharge cycle, and the microstructure changes over the course of the cell's life as particles are pulverized, the porosity of the anode is rearranged, and solid-electrolyte-interface (SEI) grows on the surface of the anode. These effects lead to a cell impedance that is SOC and SOH dependent. These dependencies may be nonlinear and may depend on the specific voltage, current, and temperature history of the cell. Thus, the cell impedance and any SOH-dependent changes to the cell impedance may not be described by simple models. For these reasons, SOC estimation by a BMS in the conventional Li-ion batteries will be highly inaccurate in Si/Li batteries, making the BMS unable to properly apply SOC balancing. Additionally, even in conventional Li-ion batteries, and other types of batteries, the use of more sophisticated nonlinear models, such as those based on machine-learning (ML), will allow for more accurate SOC estimation.

Accordingly, in various example embodiments, the BMS 140 may be configured to control (e.g., set, adjust, or modify) one or more operating parameters of (e.g., current applied to) individual batteries, cells, strings of cells, groups of cells that are connected in parallel, or other groups of cells (such as a module) in a battery module or pack, to equilibrate or at least modify the SOC to be closer to each other, ensuring all the cells or groups of cells are at a more uniform SOC, where SOC is defined as the fraction or percent of capacity between the fully discharged state (0%). The cells may comprise silicon as active material. In particular, the cells may comprise >50% silicon as active material. The BMS 140 may be configured to calculate the SOC using enhanced SOC model(s).

In an example embodiment, the SOC model used in the BMS 140 to calculate the SOC may be a physical model of the cell. In this regard, such physical model may be based on any combination of physical phenomena modeled as factors that affect the relationship between SOC and cell voltage, current, and temperature. The physical phenomena may be modeled using such factors as: 1) OCV hysteresis modeled by two different OCV vs. SOC curves, one for charge and one for discharge; 2) OCV hysteresis modeled by differences in thermodynamic pathways for lithiation and delithiation; 3) OCV hysteresis modeled by a correction to the OCV vs. SOC curved based on the mechanical strain in the electrode particles; 4) SOC-dependent impedance; 5) SOC-dependent changes to the porosity, particle size, interfacial resistance, and other properties of the microstructure that affect the impedance of the electrode; 6) SOH-dependent changes the porosity, particle size, interfacial resistance, and other properties of the microstructure that affect the impedance of the electrode; 7) a method of OCV hysteresis estimation that may have an SOH-dependent component; 8) OCV hysteresis modeled by different OCV vs. SOC curves at charge and discharge at different levels of SOH; and/or 9) OCV hysteresis modeled by different OCV vs. SOC curves at charge and discharge at different temperatures.

In an example embodiment, the SOC model used in the BMS 140 to calculate the SOC may be a machine-learning (ML) model trained on data acquired during operation of multiple cells and battery packs. The ML model may be trained using one or more ML algorithms that may include, but are not limited to: linear regression, logistic regression, nonlinear regression, decision tree ensemble methods (e.g., gradient boosting or random forests), neural networks, recurrent neural networks (e.g., long-short-term memory networks), attention models (e.g., transformers), Gaussian process algorithms, Bayesian algorithms, graph neutral networks, support vector machines, clustering algorithms (e.g., K-nearest regression), and multilayer perception models. The ML model may be trained using various combinations of pertinent data features. For example, the ML model may be trained using a combination of data features relating to one or more of voltage, current, temperature, cumulative charge and discharge capacity, curve fits of other quantitative calculations based on portions of voltage profiles, voltage, thickness, and impedance measurements acquired during the manufacture of the cell, features calculated based on sections of the voltage profile of the cell, the change in voltage when the cell transitions from a state with no current applied to a state with current applied, the complete voltage, current, and temperature history of the cell, any frequency-based information (e.g. via Fourier transform or wavelet analysis) on any portion of any of the historic data of a cell, and any probabilistic characterizations or deductions of the transitions across any portion of any of the historic data of a cell.

In an example embodiment, the SOC model used in the BMS 140 to calculate the SOC may be a multilayer perceptron (MLP) model. The MLP model may be composed of hidden layers.

In an example embodiment, the SOC model used in the BMS 140 to calculate the SOC may be trained, such as using an Adam optimizer.

In an example embodiment, the SOC model used in the BMS 140 to calculate the SOC may be trained until it achieves a mean absolute error (MAE) meeting particular threshold(s), such as less than 0.1 (or less than 0.05) compared to actual SOC.

In an example embodiment, the SOC model used in the BMS 140 to calculate the SOC may be trained until it achieves a root mean square error (RMSE) and/or an r-squared value meeting particular threshold(s). An example threshold, for use for root mean square error, may be being less than 0.15 (or 0.1 or 0.5) compared to actual SOC. Another example threshold may be being higher than 0.95 (or 0.9 or 0.8 or 0.7) r-squared value compared to actual SOC.

In an example embodiment, the SOC model used in the BMS 140 to calculate the SOC may take as an input to the SOH of the cell based on a separate SOH model. In this regard, the SOH model may be of any of the model types described above (with respect to SOC) and may take as input any of the parameters or data features described above. In some instances, the SOH model may be an enhanced SOH model, as described in more detail in incorporated U.S. patent application Ser. No. 17/548,845, filed on Dec. 13, 2021.

In an example embodiment, the SOC model used in the BMS 140 to calculate the SOC may be a semi-empirical model—that is, with the model being based on a mixture of physics and fits to data.

In an example embodiment, the SOC model used in the BMS 140 to calculate the SOC may be configured as, and/or may be determined using a combination of the models described above.

In an example embodiment, parameters used in the SOC model, for each cell or group of cells, may be based on data acquired during manufacturing. For example, such data may include, but is not limited to, cell thickness, cell resistance, cell open circuit voltage (OCV), and any data related to or acquired during the formation of the cell and/or fabrication of the cell components.

In an example embodiment, parameters used in the SOC model, for each cell or group of cells, may be based on, or be updated based on, data acquired during the operation of the cell(s). For example, the parameters or updates thereto may be based on calculated SOH of the cell(s), but may also be based on any other calculation.

In an example embodiment, SOC prediction(s) per cell or group of cells may be updated based on the deviation between the most recent SOC calculation and SOC measurement(s), or based on changes to the predicted useful life generated by the SOC model. For example, in a scenario where the true SOC of a cell is occasionally measured, on measurement number n, the difference between the measured SOC and the calculated SOC is δ. For subsequent calculations of SOC (until the next measurement), δ may be added to SOC value generated by the SOC model(s) to generate an updated SOC calculation, and such updated SOC calculation may be used by BMS 140. The procedure may be repeated after each measurement of true SOC is made.

In an example implementation, BMS 140 may be configured to keep the cells or groups of cells within a particular, predefined range with respect to a particular value or parameter. For example, BMS 140 may be configured to keep the cells or groups of cells within 5%, 2%, 1% or 0.5% of a tracked value at any given point in the life of the pack. The tracked value may be the median or average SOC of the cells in the pack.

In an example implementation, BMS 140 may be configured to keep the cells or groups of cells within a particular, predefined range with respect to a particular value or parameter.

In an example embodiment, BMS 140 may be configured to control the discharge current applied to cells based on the calculated SOC values, such that current applied to cells with SOC lower than the average of the pack is reduced.

In an example embodiment, BMS 140 may be configured to control the discharge current applied to cells based on the calculated SOC values, such that current applied to cells with SOC higher than the average of the pack is increased.

In an example embodiment, BMS 140 may be configured to control the discharge current applied to cells based on the calculated SOC values, such that current applied to cells with SOC lower than the average of the pack is increased.

In an example embodiment, BMS 140 may be configured to control the discharge current applied to cells based on the calculated SOC values, such that current applied to cells with SOC higher than the average of the pack is reduced.

In an example embodiment, BMS 140 may be configured to control the discharge current applied to cells based on the calculated SOC values, such that no current is applied to cells whose SOC is calculated to be above or below a certain threshold—e.g., above 99% or below 1%, above 95% or below 5%, above 90% or below 10%.

Figure 2:
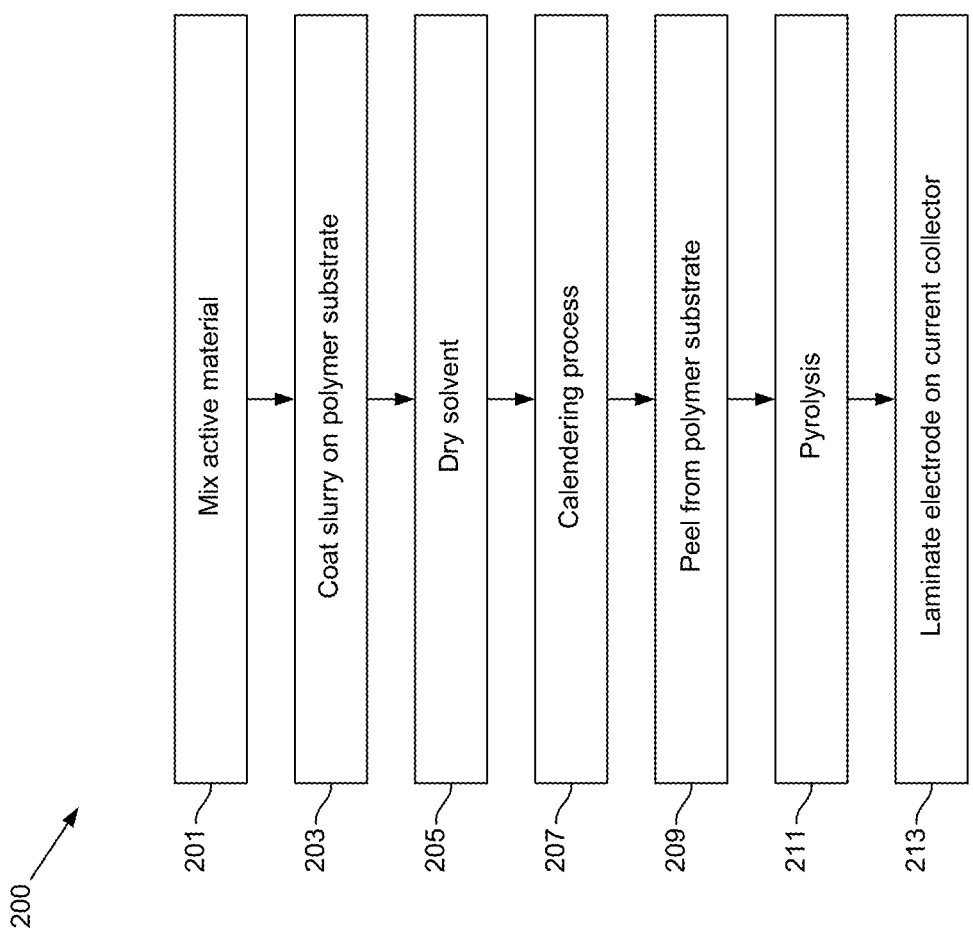
FIG. 2 is a flow diagram of an example lamination process for forming a silicon anode.

FIG. 2 is a flow diagram of an example lamination process for forming a silicon anode. Shown in FIG. 2 is flow chart 200, comprising a plurality of example steps (represented as blocks 201-213) for an example lamination process. In this regard, this process employs a high-temperature pyrolysis process on a substrate, layer removal, and a lamination process to adhere the active material layer to a current collector.

The raw electrode active material is mixed in step 201. In the mixing process, the active material may be mixed, e.g., a binder/resin (such as PI, PAI), solvent (e.g., as organic or aqueous), and conductive additives. The materials may comprise carbon nanotubes/fibers, graphene sheets, graphene oxide, metal polymers, metals, semiconductors, and/or metal oxides, for example. The additives may comprise 1D filaments with one dimension at least 4×, at least 10×, or at least 20× that of the other two dimensions, 2D sheets or mesh with two dimensions at least 4×, at least 10×, or at least 20× that of the other dimension, or 3D structures with one dimension at least 20×, at least 10×, or at least 4× that of the other two, where none of the dimensions are of nanoscale size. Silicon powder with a 1-30 or 5-30 µm particle size, for example, may then be dispersed in polyamic acid resin (15% solids in N-Methyl pyrrolidone (NMP)) at, e.g., 1000 rpm for, e.g., 10 minutes, and then the conjugated carbon/NMP slurry may be added and dispersed at, e.g., 2000 rpm for, e.g., 10 minutes to achieve a slurry viscosity within 2000-4000 cP and a total solid content of about 30%.

In step 203, the slurry may be coated on a substrate. In this step, the slurry may be coated onto a Polyester, polyethylene terephthalate (PET), or Mylar film at a loading of, e.g., 2-4 mg/cm$^2$ and then in step 205 undergo drying to an anode coupon with high Si content and less than 15% residual solvent content. This may be followed by an optional calendering process in step 207, where a series of hard pressure rollers may be used to finish the film/substrate into a smoothed and denser sheet of material.

In step 209, the green film may then be removed from the PET, where the active material may be peeled off the polymer substrate, the peeling process being optional for a polypropylene (PP) substrate, since PP can leave ~2% char residue upon pyrolysis. The peeling may be followed by a pyrolysis step 211 where the material may be heated to >900° C. but less than 1250° C. for 1-3 hours, cut into sheets, and vacuum dried using a two-stage process (120° C. for 15h, 220° C. for 5 h). The dry film may be thermally treated at, e.g., 1100-1200° C. to convert the polymer matrix into carbon.

In step 213 the electrode material may be laminated on a current collector. For example, a 5-20 µm thick copper foil may be coated with polyamide-imide with a nominal loading of, e.g., 0.2-0.6 mg/cm$^2$ (applied as a 6 wt % varnish in NMP and dried for, e.g., 12-18 hours at, e.g., 110° C. under vacuum). The anode coupon may then be laminated on this adhesive-coated current collector. In an example scenario, the silicon-carbon composite film is laminated to the coated copper using a heated hydraulic press. An example lamination press process comprises 30-70 seconds at 300° C. and 3000-5000 psi, thereby forming the finished silicon-composite electrode.

The process described above is one example process that represents a composite with fabrication steps including pyrolysis and lamination. Another example scenario comprises a direct coating process in which an anode slurry is directly coated on a copper foil using a binder such as CMC, SBR, Sodium Alginate, PAI, PI, PAA, and mixtures and combinations thereof. The process in this example comprises: direct coat active material on a current collector, dry, calendering, heat treatment.

In a direct coating process, an anode slurry is coated on a current collector with residual solvent followed by a calendaring process for densification followed by pyrolysis (~500-800° C.) such that carbon precursors are partially or completely converted into pyrolytic carbon. Pyrolysis can be done either in roll form or after punching. If done in roll form, the punching is done after the pyrolysis process.

In another example of a direct coating process, an anode slurry may be coated on a current collector with low residual solvent followed by a calendaring process for densification followed by removal of residual solvent.

Figure 3:
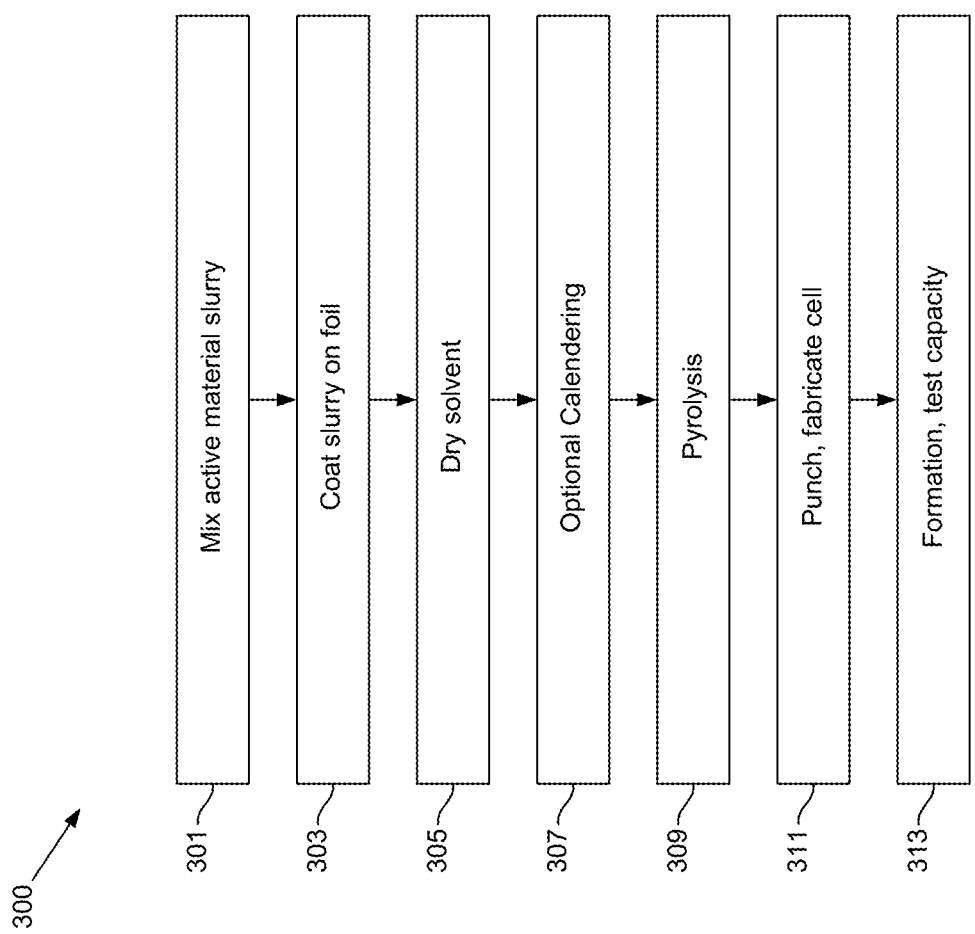
FIG. 3 is a flow diagram of an example direct coating process for forming a silicon anode.

In an example scenario, the conductive structural additives, which may be added in step 201 in FIG. 2 or step 301 in FIG. 3, may comprise between 1 and 40% by weight of the anode composition, with between 50% and 99% silicon by weight. The fibrous (1D) particles may have an aspect ratio of at least 4, but may be higher than 10, higher than 20, or higher than 40, for example, and may comprise a tubular or fiber-like conductive structure with nanoscale size in two-dimensions, where carbon-based examples comprise carbon nanotubes, carbon nanofibers (CNF), and vapor grown carbon fibers (VGCP). Other fibrous structures are possible, such as metals, metal polymers, metal oxides The 2D carbon structures may have an average dimension in the micron scale in each of the two non-nanoscale dimensions that is at least 4× that in the thickness direction, for example, and may be at least 20× larger, or at least 40× larger in the lateral directions as compared to the thickness direction. Graphene sheets are an example of conductive carbon additives, while other 2D structures are possible, such as "wire" meshes of metal or metal polymers, for example.

Furthermore, the active material may comprise 3D conductive structural additives, where the material is not limited to nanoscale in any one dimension. In a 3D additive example, one dimension of the structure may be at least 4×, at least 10×, or at least 20× that of the other two dimensions, where none of the dimensions are of nanoscale size. Examples of 3D conductive structural additives may be "chunks" of carbon, metal, metal polymer, or semiconductors.

In another example scenario, the anode active material layer fabricated with the carbon additive described above may comprise 20 to 95% silicon and in yet another example scenario may comprise 50 to 95% silicon by weight.

FIG. 3 is a flow diagram of an example direct coating process for forming a silicon anode. Shown in FIG. 3 is flow chart 300, comprising a plurality of example steps (represented as blocks 301-313) for an example direct coating process. In this regard, this process comprises physically mixing the active material, conductive additive, and binder together, and coating it directly on a current collector. This example process comprises a direct coating process in which an anode or cathode slurry is directly coated on a copper foil using a binder such as CMC, SBR, Sodium Alginate, PAI, PI, PAA, and mixtures and combinations thereof.

In step 301, the active material may be mixed, e.g., a binder/resin (such as PI, PAI), solvent, and conductive and structural additive. For example, the additives may comprise conductive materials that also provide structural continuity between cracks in the anode following multiple cycles. The materials may comprise carbon nanotubes/fibers, graphene sheets, metal polymers, metals, semiconductors, and/or metal oxides, metal/carbon nanofiber or metal/carbon nanotube composites, carbon nanowire bundles, for example. Silicon powder with a 5-30 μm particle size, for example, may then be dispersed in polyamic acid resin (15% solids in N-Methyl pyrrolidone (NMP)) at, e.g., 1000 rpm for, e.g., 10 minutes, and then the conjugated carbon/NMP slurry may be added and dispersed at, e.g., 2000 rpm for, e.g., 10 minutes to achieve a slurry viscosity within 2000-4000 cP and a total solid content of about 30%.

Furthermore, cathode active materials may be mixed in step 301, where the active material may comprise lithium cobalt oxide (LCO), lithium manganese oxide (LMO), lithium iron phosphate (LFP), lithium nickel cobalt manganese oxide (NMC), lithium nickel cobalt aluminum oxide (NCA), nickel, cobalt, manganese and aluminum (NCMA), lithium nickel manganese spinel, or similar materials or combinations thereof, mixed with a binder as described above for the anode active material.

In step 303, the slurry may be coated on a copper foil. Similarly, cathode active materials may be coated on a foil material, such as aluminum, for example. The active material layer may undergo a drying in step 305 resulting in reduced residual solvent content. An optional calendering process may be utilized in step 307 where a series of hard pressure rollers may be used to finish the film/substrate into a smoother and denser sheet of material. In step 307, the foil and coating proceeds through a roll press for lamination.

In step 309, the active material may be pyrolyzed by heating to 500-1000° C. such that carbon precursors are partially or completely converted into glassy carbon. The pyrolysis step may result in an anode active material having silicon content greater than or equal to 50% by weight, where the anode has been subjected to heating at or above 400° C.

Pyrolysis can be done either in roll form or after punching in step 311. If done in roll form, the punching is done after the pyrolysis process. In instances where the current collector foil is not pre-punched/pre-perforated, the formed electrode may be perforated with a punching roller, for example. The punched electrodes may then be sandwiched with a separator and electrolyte to form a cell. In some instances, separator with significant adhesive properties, in accordance with the present disclosure, may be utilized.

In step 313, the cell may be subjected to a formation process, comprising initial charge and discharge steps to lithiate the anode, with some residual lithium remaining, and the cell capacity may be assessed.

Figure 4:
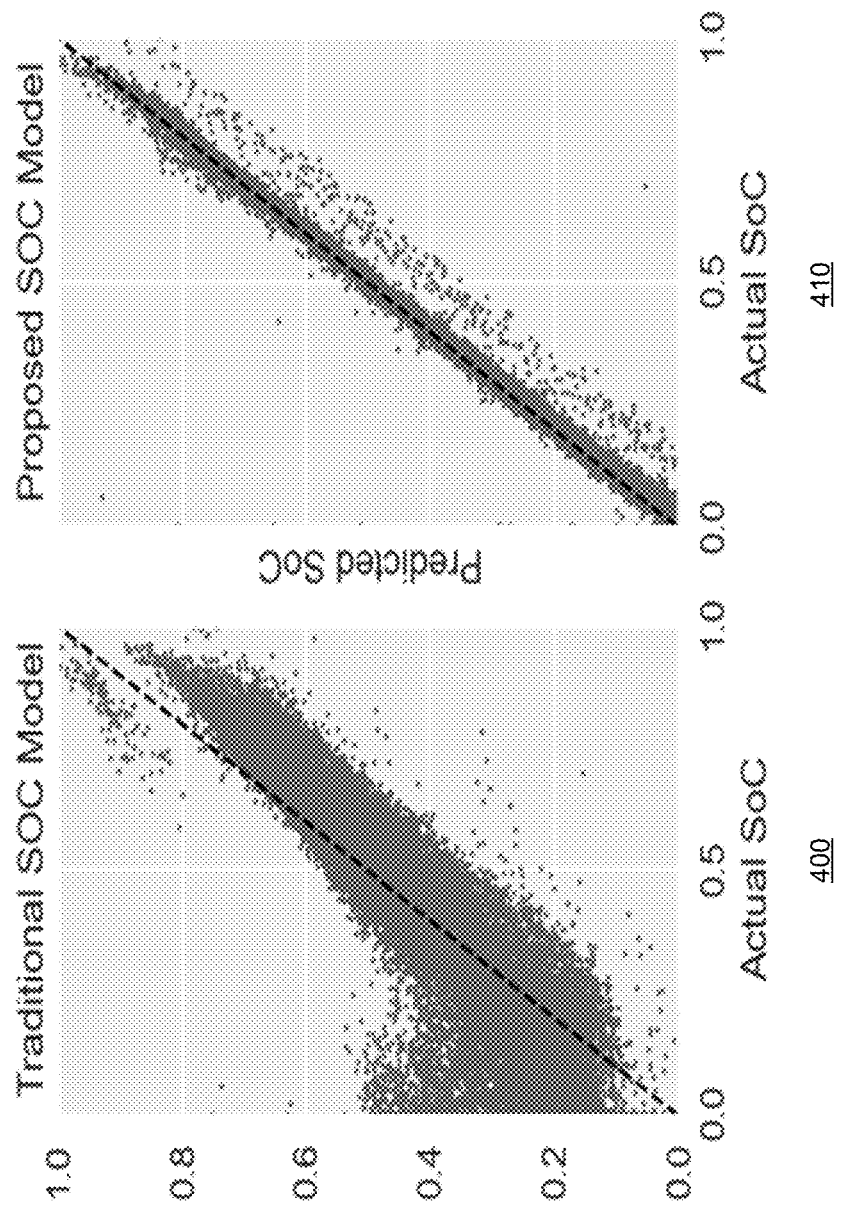
FIG. 4 is a plot diagram illustrating a comparison between a conventional state-of-charge (SOC) model and an enhanced state-of-charge (SOC) models in accordance with the present disclosure.

FIG. 4 is a plot diagram illustrating a comparison between a conventional state-of-charge (SOC) model and an enhanced state-of-charge (SOC) models in accordance with the present disclosure. Shown in FIG. 4 are plots 400 and 410.

In this regard, plot 400 illustrates performance of an example conventional Li-ion battery SOC model whereas plot 410 illustrates performance of an example enhanced SOC model in accordance with the present disclosure. For example, the enhanced SOC model may be an ML-based SOC model, as described above. Each of plots 400 and 410 include predicted versus measured SOC values, to illustrate performance comparison between conventional SOC models—that is, SOC models configured for use in conjunction with conventional Li-ion battery SOC model features—versus enhanced SOC models as described in the present disclosure.

In each of plots 400 and 410, the y-axis shows the SOC (values) predicted by the model and the x-axis shows the actual SOC (values). Thus, each point in the plot represents the measured and calculated values for a single SOC point from the cycled cells in the dataset. The dashed lines represent instances where the modeled SOC equals the actual SOC. Both models may be tested on a number (e.g., 49) of different cycled cells, where the rates of charge and discharge, and the high and low cut-off voltages, are randomly selected at each cycle, resulting in charge and discharge sequences that begin and end at a variety of SOC values. As illustrated in FIG. 4, the SOC predictions made using the enhanced SOC model (plot 410) are better as they are closer to the fitted line compared to the SOC predictions made using the conventional SOC model (plot 400).

In this regard, with respect to the data captured in plots 400 and 410, the conventional model calculates the SOC using a conventional approach—e.g., with the cell's voltage and current measured and used to calculate the OCV by subtracting the product of the measured current and circuit impedance from the measured cell voltage. The calculated OCV is then used to estimate the SOC. This may be done using collected data, where the relationship between the OCV and SOC of a battery cell is captured by, e.g., fitting a $7^{th}$ order degree polynomial to the pair. Such approach uses an impedance value of R=0.101Ω, which was selected after performing a parameter sweep of values between R=0Ω to R=10Ω by increments of 0.0101Ω, where the value that returned the best overall performance was selected. The current and voltage values fed to the model are collected at the beginning of charge. The enhanced SOC model used in generating the data in plot 410 may be a trained ML model, such as a multilayer perceptron (MLP) model. In this regard, the particular MLP model illustrated in FIG. 4 may be composed of 5 hidden layers, with 256, 128, 128, 128, and 64 nodes in each consecutive layer. The model is trained using the Adam optimizer, with a learning rate of 0.01 for 500 epochs.

Similarly to the conventional model, the ML model considers the voltage and current at the beginning of charge. The ML model is also given the values directly before and after charge current is applied, which with the current and the sampling frequency are used to calculate the impedance and power. Additionally, the growth (slope and duration) of the voltage in the moments immediately preceding the application of charge current are used as input. Table 1 (below) shows the mean absolute error (MAE), root mean square error (RMSE), and $R^2$ scores for the two models:

TABLE 1 performance scores for the conventional and enhanced SOC models

| Model | MAE | RMSE | $R^2$ |
|---|---|---|---|
| Conventional | 0.119338 | 0.166083 | 0.635351 |
| ML | 0.012596 | 0.026747 | 0.990543 |

As shown in Table 1, the ML model outperforms the conventional model in the various metrics considered, with the ML model have substantially lower error and higher $R^2$ than the conventional model.

Accordingly, implementations in accordance with the present disclosure provide battery control and management solutions that allow for finer control over individual cells or groups of cells in battery packs, achieving better optimization of the system. In particular, based on unique chemistry and characteristics of Si/Li batteries, the SOC of all cells in each battery pack may be successfully modeled under any operating condition, allowing for greater utilization of the capacity of battery pack and better protection against the over-charge or over-discharge of individual cells, which may improve both performance as well as total cost of ownership. Also, implementations based on the present disclosure may be fully tuned to the specific application of the battery packs. In this regard, the only key requirements may be the existence of a model capable of calculating the SOC, and an algorithm in the battery control and management system (e.g., BMS) that may allow for translating the SOC calculation into actions taken to balance the SOCs.

Further, while various implementations are described with respect to Si/Li batteries, the disclosure is not so limited, and various features based thereon may be used with any suitable cell chemistry. The disclosure may also be used with any number of cells. Further, implementations based on the present disclosure may be combined with other solutions and control techniques, including those in which SOC may be calculated by other means, including conventional methods, which may use a model based on a fixed OCV and an equivalent circuit as an additional input. Implementations based on the present disclosure also may be used in combination with other model-based BMS applications, such as an SOH-balanced BMS, as described in incorporated U.S. patent application Ser. No. 17/548,851, filed on Dec. 13, 2021.

An example method, in accordance with the present disclosure, for managing a battery pack that comprises one or more lithium-ion cells comprises assessing state-of-charge (SOC) of the one or more lithium-ion cells; and controlling, based on the assessing of state-of-charge (SOC), the one or more lithium-ion cells; where the controlling comprises setting or modifying one or more operating parameters of at least one lithium-ion cell; and where the controlling is configured to equilibrate the state-of-charge (SOC) of the one or more lithium-ion cells or to modify a state-of-charge (SOC) of at least one lithium-ion cell so that the one or more lithium-ion cells have a balanced state-of-charge (SOC).

In an example embodiment, each of the one or more lithium-ion cells comprises a silicon-dominant cell comprising a silicon-dominant anode with silicon >50% of active material of the anode.

In an example embodiment, assessing the state-of-charge (SOC) comprises calculating the state-of-charge (SOC) using one or more state-of-charge (SOC) models.

In an example embodiment, the method further comprises configuring at least one state-of-charge (SOC) model based on a physics-based model associated with at least one lithium-ion cell, where the physics-based model comprises information relating to modeling of one or more physical phenomena as factors that affect the SOC.

In an example embodiment, the method further comprises configuring at least one state-of-charge (SOC) model based on a machine-learning (ML) model.

In an example embodiment, the method further comprises training the machine-learning (ML) model using one or more machine-learning (ML) algorithms. For example, the one or more machine-learning (ML) algorithms may comprise at least one of linear regression, logistic regression, nonlinear regression, decision tree ensemble methods, neural networks, recurrent neural networks, attention models, Gaussian process algorithms, Bayesian algorithms, graph neutral networks, support vector machines, clustering techniques, and multilayer perception models.

In an example embodiment, the method further comprises training at least one state-of-charge (SOC) model.

In an example embodiment, the method further comprises training the at least one state-of-charge (SOC) model using training data. The training data comprises one or more data features relating to one or more of voltage, current, temperature, cumulative charge and discharge capacity, curve fits of other quantitative calculations based on portions of voltage profiles, voltage, thickness, and impedance measurements acquired during cell manufacture, features calculated based on sections of a voltage profile, change in voltage during cell transitions from a state with no current applied to a state with current applied, complete voltage, current, and temperature history of a cell, and any frequency-based on any portion of any of the historic data of a cell, and any probabilistic characterizations or deductions of the transitions across any portion of any of the historic data of a cell.

In an example embodiment, the method further comprises acquiring the training data. For example, the training data may be acquired from repeated charge/discharge cycling of the cells using a standardized or randomized protocol; operation of the cells using a standardized drive cycle protocol such as the Federal Urban Driving Schedule, Worldwide Harmonized Light Vehicles Test Procedure, or the US06 drive schedule; and/or the operation of the cells directly in their mode of operation, such as in an electric vehicle where the data is extracted from the vehicle's onboard BMS.

In an example embodiment, the method further comprises training the at least one state-of-charge (SOC) model using an Adam optimizer.

In an example embodiment, the method further comprises configuring at least one state-of-charge (SOC) model using data related to or acquired during formation of at least one lithium-ion cell or fabrication of one or more components of at least one lithium-ion cell.

In an example embodiment, the method further comprises configuring at least one state-of-charge (SOC) model using data related to or acquired during operation of at least one lithium-ion cell.

In an example embodiment, at least one state-of-charge (SOC) model comprises a multilayer perceptron (MLP) model.

In an example embodiment, the method further comprises training at least one state-of-charge (SOC) model until it achieves a mean absolute error (MAE) meeting one or more predefined thresholds.

In an example embodiment, the method further comprises training at least one state-of-charge (SOC) model until it achieves a root mean square error (RMSE) and/or an r-squared value meeting one or more predefined thresholds.

In an example embodiment, the method further comprises controlling the one or more lithium-ion cells to maintain the one or more lithium-ion cell within a predefined range of a tracked value at any given point in a life of the battery pack.

In an example embodiment, the one or more operating parameters comprise current applied to at least one lithium-ion cell, and the method further comprises controlling comprising setting or adjusting the current based on calculated SOC value associated with the to at least one lithium-ion cell and/or to balance the SOC values of the one or more lithium-ion cells.

In an example embodiment, assessing of the state-of-charge (SOC) comprises determining state-of-charge (SOC) prediction for at least one lithium-ion cell; and controlling further comprises determining at least one action based on the SOC prediction.

In an example embodiment, the method further comprises determining the state-of-charge (SOC) prediction based on or using one or more of: deviation between a most recent state-of-charge (SOC) calculation and state-of-charge (SOC) measurement, changes to predicted useful life for the at least one lithium-ion cell, and reinforcement learning based modeling.

An example system, in accordance with the present disclosure, comprises: one or more lithium-ion cells; and one or more circuits configured to: assess state-of-charge (SOC) of the one or more lithium-ion cells; and control, based on the assessing of state-of-charge (SOC), the one or more lithium-ion cells; where the controlling comprises setting or modifying one or more operating parameters of at least one lithium-ion cell; and where the controlling is configured to equilibrate the state-of-charge (SOC) of the one or more lithium-ion cells or to modify a state-of-charge (SOC) of at least one lithium-ion cell such as the one or more lithium-ion cells have a balanced state-of-charge (SOC).

In an example embodiment, each of the one or more lithium-ion cells comprises a silicon-dominant cell comprising a silicon-dominant anode with silicon >50% of active material of the anode.

In an example embodiment, the one or more circuits are configured to calculate the state-of-charge (SOC) for at least one lithium-ion cell using one or more state-of-charge (SOC) models.

In an example embodiment, the one or more circuits are configured to train at least one state-of-charge (SOC) model.

In an example embodiment, the one or more circuits are configured to train the at least one state-of-charge (SOC) model using training data.

In an example embodiment, the one or more circuits are configured to train the at least one state-of-charge (SOC) model using an Adam optimizer.

In an example embodiment, the one or more circuits are configured to configure at least one state-of-charge (SOC) model using data related to or acquired during formation of at least one lithium-ion cell or fabrication of one or more components of at least one lithium-ion cell.

In an example embodiment, the one or more circuits are configured to configure at least one state-of-charge (SOC) model using data related to or acquired during operation of at least one lithium-ion cell.

In an example embodiment, the one or more circuits are configured to control the one or more lithium-ion cells to maintain the one or more lithium-ion cell within a predefined range of a tracked value at any given point in a life of a battery pack comprising the one or more lithium-ion cells.

In an example embodiment, the one or more operating parameters comprise current applied to at least one lithium-ion cell, and wherein the one or more circuits are configured to set or adjust the current based on calculated SOC value associated with the to at least one lithium-ion cell and/or to balance the SOC values of the one or more lithium-ion cells.

In an example embodiment, the one or more circuits are configured to, when assessing the state-of-charge (SOC): determine state-of-charge (SOC) prediction for at least one lithium-ion cell, and determine at least one action based on the SOC prediction.

In an example embodiment, the one or more circuits are configured to determine the state-of-charge (SOC) prediction based on or using one or more of: deviation between a most recent state-of-charge (SOC) calculation and state-of-charge (SOC) measurement, changes to predicted useful life for the at least one lithium-ion cell, and reinforcement learning based modeling.

As utilized herein, "and/or" means any one or more of the items in the list joined by "and/or". As an example, "x and/or y" means any element of the three-element set {(x), (y), (x, y)}. In other words, "x and/or y" means "one or both of x and y." As another example, "x, y, and/or z" means any element of the seven-element set {(x), (y), (z), (x, y), (x, z), (y, z), (x, y, z)}. In other words, "x, y and/or z" means "one or more of x, y, and z." As utilized herein, the term "exemplary" means serving as a non-limiting example, instance, or illustration. As utilized herein, the terms "for example" and "e.g." set off lists of one or more non-limiting examples, instances, or illustrations.

As utilized herein the terms "circuits" and "circuitry" refer to physical electronic components (e.g., hardware), and any software and/or firmware ("code") that may configure the hardware, be executed by the hardware, and or otherwise be associated with the hardware. As used herein, for example, a particular processor and memory (e.g., a volatile or non-volatile memory device, a general computer-readable medium, etc.) may comprise a first "circuit" when executing a first one or more lines of code and may comprise a second "circuit" when executing a second one or more lines of code. Additionally, a circuit may comprise analog and/or digital circuitry. Such circuitry may, for example, operate on analog and/or digital signals. It should be understood that a circuit may be in a single device or chip, on a single motherboard, in a single chassis, in a plurality of enclosures at a single geographical location, in a plurality of enclosures distributed over a plurality of geographical locations, etc. Similarly, the term "module" may, for example, refer to a physical electronic components (e.g., hardware) and any software and/or firmware ("code") that may configure the hardware, be executed by the hardware, and or otherwise be associated with the hardware.

As utilized herein, circuitry or module is "operable" to perform a function whenever the circuitry or module comprises the necessary hardware and code (if any is necessary) to perform the function, regardless of whether performance of the function is disabled or not enabled (e.g., by a user-configurable setting, factory trim, etc.).

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the processes as described herein.

Accordingly, various embodiments in accordance with the present invention may be realized in hardware, software, or a combination of hardware and software. The present invention may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip.

Various embodiments in accordance with the present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for managing a battery pack comprising a plurality of lithium-ion cells, the method comprising:
   assessing state-of-charge (SOC) of the plurality of lithium-ion cells; and
   controlling, based on the assessing of state-of-charge (SOC), the plurality of lithium-ion cells;
   wherein one or more of the plurality of lithium-ion cells are silicon/lithium (Si/Li) cells;
   wherein assessing the state-of-charge (SOC) comprises calculating the state-of-charge (SOC) using one or more state-of-charge (SOC) models that account for one or more characteristics that are associated with silicon/lithium (Si/Li) cells;
   wherein the one or more characteristics comprise one or both of open circuit voltage (OCV) hysteresis and nonlinear time-dependent transition in the OCV during transitions between charge to discharge states; and
   wherein the controlling is configured to equilibrate the state-of-charge (SOC) of the plurality of lithium-ion cells, or to modify a state-of-charge (SOC) of an individual lithium-ion cell or groups of lithium-ion cells so that the plurality of lithium-ion cells as a whole has a balanced state-of-charge (SOC).

2. The method of claim 1, wherein each of the plurality of lithium-ion cells comprises a silicon-dominant cell comprising a silicon-dominant anode with silicon >50% of active material of the anode.

3. The method of claim 1, further comprising configuring at least one state-of-charge (SOC) model based on a physics-based model associated with at least one lithium-ion cell, and wherein the physics-based model comprises information relating to modeling of one or more physical phenomena as factors that affect the SOC.

4. The method of claim 1, further comprising configuring at least one state-of-charge (SOC) model based on a machine-learning (ML) model.

5. The method of claim 4, further comprising training the machine-learning (ML) model using one or more machine-learning (ML) algorithms.

6. The method of claim 1, further comprising training at least one state-of-charge (SOC) model.

7. The method of claim 6, further comprising training the at least one state-of-charge (SOC) model using training data.

8. The method of claim 6, further comprising training the at least one state-of-charge (SOC) model using an Adam optimizer.

9. The method of claim 1, further comprising configuring at least one state-of-charge (SOC) model using data related to or acquired during formation of at least one lithium-ion cell or fabrication of one or more components of at least one lithium-ion cell.

10. The method of claim 1, further comprising configuring at least one state-of-charge (SOC) model using data related to or acquired during operation of at least one lithium-ion cell.

11. The method of claim 1, wherein at least one state-of-charge (SOC) model comprises a multilayer perceptron (MLP) model.

12. The method of claim 1, further comprising training at least one state-of-charge (SOC) model until it achieves a mean absolute error (MAE) meeting one or more predefined thresholds.

13. The method of claim 1, further comprising training at least one state-of-charge (SOC) model until it achieves a root mean square error (RMSE) and/or an r-squared value meeting one or more predefined thresholds.

14. The method of claim 1, further comprising controlling the plurality of lithium-ion cells to maintain one or more lithium-ion cells of the plurality of lithium-ion cells within a predefined range of a tracked value at any given point in a life of the battery pack.

15. The method of claim 1, wherein the assessing of the state-of-charge (SOC) comprises determining state-of-charge (SOC) prediction for at least one lithium-ion cell of the plurality of lithium-ion cells; and wherein the controlling comprising determining at least one action based on the SOC prediction.

16. The method of claim 15, further comprising determining the state-of-charge (SOC) prediction based on or using one or more of: deviation between a most recent state-of-charge (SOC) calculation and state-of-charge (SOC) measurement, changes to predicted useful life for the at least one lithium-ion cell, and reinforcement learning based modeling.

17. The method of claim 1, wherein the controlling comprises setting or modifying one or more operating parameters of an individual lithium-ion cell or groups of lithium-ion cells within the plurality of lithium-ion cells.

18. The method of claim 17, wherein the one or more operating parameters comprise current applied to at least one lithium-ion cell, and wherein the controlling comprising setting or adjusting the current based on calculated SOC value associated with the individual lithium-ion cell or the groups of lithium-ion cells, and/or to balance the SOC values of the plurality of lithium-ion cells.

19. A system comprising:
a plurality of lithium-ion cells; and
one or more circuits configured to:
assess state-of-charge (SOC) of the plurality of lithium-ion cells; and
control, based on the assessing of state-of-charge (SOC), the plurality of lithium-ion cells;
wherein one or more of the plurality of lithium-ion cells are silicon/lithium (Si/Li) cells;
wherein assessing the state-of-charge (SOC) comprises calculating the state-of-charge (SOC) using one or more state-of-charge (SOC) models that account for one or more characteristics that are associated with silicon/lithium (Si/Li) cells;
wherein the one or more characteristics comprise one or both of open circuit voltage (OCV) hysteresis and nonlinear time-dependent transition in the OCV during transitions between charge to discharge states; and
wherein the controlling is configured to equilibrate the state-of-charge (SOC) of the plurality of lithium-ion cells or to modify a state-of-charge (SOC) of an individual lithium-ion cell or groups of lithium-ion cells so that the plurality of lithium-ion cells as a whole has a balanced state-of-charge (SOC).

20. The system of claim 19, wherein each of the plurality of lithium-ion cells comprises a silicon-dominant cell comprising a silicon-dominant anode with silicon >50% of active material of the anode.

21. The system of claim 19, wherein the one or more circuits are configured to train at least one state-of-charge (SOC) model.

22. The system of claim 21, wherein the one or more circuits are configured to train the at least one state-of-charge (SOC) model using training data.

23. The system of claim 21, wherein the one or more circuits are configured to train the at least one state-of-charge (SOC) model using an Adam optimizer.

24. The system of claim 19, wherein the one or more circuits are configured to configure at least one state-of-charge (SOC) model using data related to or acquired during formation of at least one lithium-ion cell or fabrication of one or more components of at least one lithium-ion cell.

25. The system of claim 19, wherein the one or more circuits are configured to configure at least one state-of-charge (SOC) model using data related to or acquired during operation of at least one lithium-ion cell.

26. The system of claim 19, wherein the one or more circuits are configured to control the plurality of lithium-ion cells to maintain one or more lithium-ion cells of the plurality of lithium-ion cells within a predefined range of a tracked value at any given point in a life of a battery pack comprising the plurality of lithium-ion cells.

27. The system of claim 19, wherein the one or more circuits are configured to, when assessing the state-of-charge (SOC): determine state-of-charge (SOC) prediction for at least one lithium-ion cell of the plurality of lithium-ion cells, and determine at least one action based on the SOC prediction.

28. The system of claim 27, wherein the one or more circuits are configured to determine the state-of-charge (SOC) prediction based on or using one or more of: deviation between a most recent state-of-charge (SOC) calculation and state-of-charge (SOC) measurement, changes to predicted useful life for the at least one lithium-ion cell, and reinforcement learning based modeling.

29. The system of claim 19, wherein the controlling comprises setting or modifying one or more operating parameters of an individual lithium-ion cell or groups of lithium-ion cells within the plurality of lithium-ion cells.

30. The system of claim 29, wherein the one or more operating parameters comprise current applied to at least one lithium-ion cell, and wherein the one or more circuits are configured to set or adjust the current based on calculated SOC value associated with the at least one lithium-ion cell and/or to balance the SOC values of the plurality of lithium-ion cells.

* * * * *